United States Patent Office 2,995,414
Patented Aug. 8, 1961

2,995,414
CONCENTRATES FOR PRODUCING EMULSIONS
Julien Paul, Fall River, Mass., assignor to United Merchants and Manufacturers, Inc., New York, N.Y., a corporation of Delaware
No Drawing. Filed May 16, 1958, Ser. No. 735,673
5 Claims. (Cl. 8—70)

This invention relates to concentrates for use in producing textile coloring emulsions. This application is a continuation-in-part of my copending patent application Serial No. 624,973, filed November 29, 1956, now United States Patent 2,894,801.

In my aforesaid copending patent application I have disclosed textile coloring oil-in-water emulsions having their inner or dispersed phase consisting essentially of a volatilizable hydrocarbon oil and the outer phase comprising water having dissolved therein a water-soluble formaldehyde sulphoxylate reducing agent and a water-soluble caseinate which inhibits oxidation of the reducing agent. Instead of, or in addition to, all or a portion of the water-soluble caseinate, water-soluble soya bean proteinate may be used. These oil-in-water emulsions are particularly adapted for use as carriers or vehicles for vat dyes.

The concentrates of the present invention are used to facilitate the production of the oil-in-water emulsions of my copending application and also in the production of other emulsions, particularly oil-in-water emulsions employed in the coloring of textiles, including printing and dyeing of textiles. Such emulsions may contain the alkali required for reaction with the water-insoluble vat dye to convert the dye into the soluble alkali-leuco form. Alternatively, the alkali may be applied separately to the fabric after the application of the emulsion containing the vat dye to cause the reaction to take place between the alkali, the reducing agent and the vat dye to convert the dye into a soluble alkali-leuco form which is readily absorbed by the fibers in the subsequent steaming or aging.

In the case of printing pastes the reducing agent may be incorporated in the continuous water phase of the emulsion. The reducing agent may be any water-soluble formaldehyde sulphoxylate, such as alkali metal formaldehyde sulphoxylates, including sodium or potassium formaldehyde sulphoxylate. Sodium is preferred for reasons of economy and ready availability. The amount of reducing agent incorporated in the vehicle in general is from 4% to 20% based on the weight of the vehicle. Within this range, the amount will vary depending on the intended use. Optimum results are obtained by using from 8% to 12% for application printing and from about 10% to 18% for discharge printing.

It is among the objects of the present invention to provide a concentrate for the production of emulsions, which concentrate facilitates the production of such emulsions, and results in the production of emulsions of improved stability. It is well known that the presence of electrolytes in emulsions tends to cause the emulsions to break. The present invention, while not limited thereto, is particularly useful in the production of stable emulsions containing electrolytes such as the alkali required for the reaction with water-insoluble vat dyes to convert them into the soluble alkali-leuco form.

It is another object of this invention to provide a concentrate which acts as an emulsifying agent; emulsion stabilizer, anti-oxidant for the reducing agent, temporary binder for the dye, which temporary binder is water soluble and hence readily removable by a water wash; and which tends to minimize migration of the dye when applied to the fiber with consequent formation of sharp patterns in the case of printed patterns, i.e., reduction of "halo" formation.

Other objects and advantages of this invention will be apparent from the following detailed description.

Concentrates of the present invention contain from 0.5% to 5%, preferably, from 0.75% to 3.5% water-soluble caseinate and/or soya bean proteinate, from 0.5% to 3.2% preferably from 2.4% to 3% sodium alginate and from 91.8% to 99% preferably 93.5% to 96.85% water. In the specification, unless otherwise indicated, the percentage content of the caseinate and/or soya bean proteinate and sodium alginate are given on a dry basis, i.e., these percentage values represent the content of solid sodium alginate and of caseinate and/or soya bean proteinate.

The ratio of water-soluble caseinate and/or soya bean proteinate to sodium alginate is critical. It is only by combining these specific constituents in proportions within the recited ranges that a concentrate results having the advantageous properties above pointed out. In general, the best color values, the greatest degee of penetration of the dyestuff into the fiber of the fabric and the minimum "halo" formation is obtained using within the above recited ranges, a minimum content of caseinate and/or soya bean proteinate and a maximum content of sodium alginate. Thus, best results are obtained with a concentrate containing about .75% of water-soluble caseinate and/or soya bean proteinate and about 3% of sodium alginate.

The sodium alginate used may be the sodium alginate of commerce available as a dry powder and sold under the trade names Superloid, Keltex, Kelgin, Kelcosol, Kelcoloid (all of these compounds are sold by the Kelco Co.), Halltex (sold by Stein-Hall & Co.), Protanal, Protanal S, and Lamitex, and Protatek (the Protanals and Protatek are sold by Croda Inc.).

As the water-soluble caseinate and/or soya bean proteinate, ammonium, borax and alkali metal, such as sodium or potassium caseinates or soya bean proteinates, may be used. The water-soluble caseinate may be made by reacting casein derived from milk in the customary manner, with ammonia, an alkali metal salt or borax to produce the water-soluble caseinate. For example, water may be heated to about 60° C., the casein added thereto, the slurry agitated at about 60° C. and thereafter the alkali, such as ammonia or alkali metal salt, or borax added while agitating and maintaining the temperature at about 60° C. to convert the insoluble casein to the soluble caseinate. Thereafter, the resulting solution is cooled to approximately room temperature and a thickener preservative, e.g., Dowicide A, added to produce the caseinate solution employed in making the emulsion. The water-soluble soya bean proteinate may be produced in the same manner by substituting soya bean protein derived from soya bean in any well known manner for the casein derived from milk.

In the production of the concentrate of this invention, a solution of the caseinate and/or soya bean proteinate may first be produced as hereinabove described. To this solution is added enough sodium alginate to produce the concentrate having the constituents within the ranges of concentration hereinabove given. The sodium alginate may be added to the caseinate and/or soya bean proteinate solution as a dry powder, or a solution of sodium alginate containing, say, about 2% to 3.2% of the sodium alginate may be produced, and this solution mixed with the solution of the caseinate and/or soya bean proteinate to produce a concentrate having these constituents in the proportions above given. These concentrates are employed to produce emulsions useful as vehicles for dyes or as vehicles for the reducing agent in producing white effects on colored textiles which have been dyed with dischargeable dyes.

The alkali, if incorporated in the vehicle, is incorporated in amount of from 2% to 12%, based on the weight of the vehicle, preferably from 5% to 10% when sodium carbonate is used as the alkali. Instead of sodium carbonate, alkali metal hydroxides, such as sodium or potassium hydroxide, potassium carbonate or amines, such as triethanolamines, may be used. When using alkali other than sodium carbonate, the amount thereof should be the chemical equivalent of the indicated amount of the sodium carbonate.

The water phase of the oil-in-water emulsion may also contain other constituents commonly employed in textile coloring, such, for example, as hygroscopic agents, e.g., glycerin, diethylene glycol, monethylene glycol, 2-methyl-2, 4-pentanediol, urea, or mixtures of these hygroscopic materials; dispersing agents, e.g., ethylene oxide condensates, such as the reaction product of hexyl heptyl beta naphthol with 9 moles of ethylene oxide per mole of hexyl heptyl beta naphthol (Feregal ON) or sodium lignin sulphonates; preservatives; germicides, fungicides or antiseptic agents, such as sodium o-phenylphenate (Dowicide A); and other agents, such as anthraquinone and other catalysts which are used to improve the discharge effect.

The use of sodium alginate in combination with water-soluble caseinates or water-soluble soya bean proteinates in the proportions above indicated has been found particularly advantageous in the production of good color values particularly from the standpoint of facilitating the reproducibility of the color in subsequent runs, and compatibility of the concentrates with dyestuffs particularly vat dyestuffs. Moreover, the use of these concentrates in the proportions above indicated results in emulsions (including emulsions containing electrolytes) of improved stability, and when the emulsions are used for printing, in sharp prints, i.e., these concentrates appear to function as antimigrants for the dye with consequent reduction of "halo." Furthermore the concentrates act as temporary binders for the dye, which binders being water-soluble, are readily removable from the fabrics by water washes.

The hydrocarbon oil in which the aqueous solution is dispersed to form the oil-in-water emulsion may be any hydrocarbon solvent, aliphatic, aromatic, or a mixture containing both aliphatic and aromatic constituents, boiling within the range of from 100° C. to about 300° C. and having a KB value of from 45 to 55. The KB value is determined as conventional by determining the point at which a standardized kauri-butanol solution at 25° C. becomes cloudy upon addition of the hydrocarbon oil thereto. Suitable hydrocarbon oils are the petroleum fractions sold as mineral spirits, such as Shell Mineral Spirits No. 8181 or Varsol No. 2. The emulsion contains from about 25% to about 45% by weight of the hydrocarbon oil phase and from about 55% to about 75% by weight of the water solution phase.

In the production of the emulsion, after the dissolution of the reducing agent and the concentrate in the water to which may be added the other constituents, if used, such as alkali, hygroscopic agent, and dispersing agent, the hydrocarbon oil is added, using, for example, an Eppenbach homogenizer for the preparation of the initial solution, as well as the emulsion. For example, the concentrate and hygroscopic agent may first be dissolved in the water employing a homogenizer for the purpose. Thereafter, the alkali, if used, is dissolved in the solution and then the reducing agent, while stirring vigorously. It is important to avoid the entrainment of air into the solution, because such air would cause oxidation of the reducing agent. Moreover, during the formation of the solution, the temperature should be maintained below about 30° C. to avoid the decomposition of the reducing agent. After formation of the solution, the hydrocarbon oil is added while continuing the agitation, thus producing the oil-in-water emulsion. It is preferable to add the hydrocarbon oil below the surface of the solution, desirably directly at the mixing head or blades of the blender or homogenizer in the batch.

The oil-in-water emulsion vehicle thus produced has a viscosity of from about 100 to 500 poises, preferably 150 to 300 poises, as determined on a Brookfield viscosimeter.

This emulsion may be applied as such to form whites on dyed fabrics, or may be mixed with vat dyes to produce color printing pastes. Thus, the oil-in-water emulsion may be mixed with from 0% to 30% vat dye. The vat dye used will of course depend on the desired color. This invention can be used to apply all known vat dyes employed in textile coloring.

When employing the concentrate to produce printing pastes, containing the reducing agent, alkali and vat dye, after application of this printing paste, the printed goods are dried, aged in a steam ager, desirably at a temperature of from about 101% C. to about 105° C. for about 6 to 10 minutes, acidified with acetic, hydrochloric or other acid, oxidized with hydrogen peroxide, sodium bichromate or sodium perborate, thereafter washed with a dilute soap or detergent solution and then dried to bring out the color contrast to best advantage.

When the oil-in-water emulsion is applied as such to fabrics which have been dyed with dischargeable dyes, the treatment is substantially the same. The treatment in the steam ager results in the reducing agent reacting with the dyed fabric to produce whites wherever the reducing agent is applied.

The concentrates of this invention may be used in producing oil-in-water emulsions for the coloring of all textiles, natural as well as synthetic, and blends of both, including, but without limitation, cellulosic fabrics, regenerated cellulosic fabrics, and animal fiber fabrics such as silk and wool fabrics, etc.

The following examples are given for the purpose of illustrating the invention. It will be understood the invention is not limited to these examples.

In the production of the examples sodium alginate was dissolved in water to produce a solution containing 3.2% of sodium alginate. A solution containing 15% ammonium caseinate was prepared as above described. These two solutions were mixed in varying proportions to produce concentrates containing these two constituents in the proportions given in Table I which follows:

*Table I*

| Example No. | Percent 3.2% Sodium Alginate Solution | Percent 15% Ammonium Caseinate Solution | Percent Dry Sodium Alginate | Percent Dry Ammonium Caseinate | Percent Water |
| --- | --- | --- | --- | --- | --- |
| 1 | 96.25 | 3.75 | 3.08 | 0.56 | 96.36 |
| 2 | 95 | 5.00 | 3.04 | 0.75 | 96.21 |
| 3 | 90 | 10.00 | 2.88 | 1.50 | 95.62 |
| 4 | 85 | 15.00 | 2.72 | 2.25 | 95.03 |
| 5 | 80 | 20.00 | 2.56 | 3.00 | 94.44 |
| 6 | 75 | 25.00 | 2.40 | 3.75 | 93.90 |

In a second set of examples a 15% sodium soya bean proteinate solution is substituted for the 15% ammonium caseinate solution. In Table II which follows is given the percentage composition on a dry basis of this second set of examples.

Table II

| Example No. | Percent Dry Sodium Alginate | Percent Dry Sodium Soya Bean Proteinate | Percent Water |
|---|---|---|---|
| 7 | 3.08 | 0.56 | 96.36 |
| 8 | 3.04 | 0.75 | 96.21 |
| 9 | 2.88 | 1.50 | 95.62 |
| 10 | 2.72 | 2.25 | 95.03 |
| 11 | 2.56 | 3.00 | 94.44 |
| 12 | 2.40 | 3.75 | 93.90 |

Sodium, potassium or borax caseinate can be substituted for the ammonium caseinate in the examples of Table I, and ammonium, potassium or borax soya bean proteinate can be substituted for the sodium soya bean proteinate in the examples of Table II. It will be appreciated that concentrates containing the enumerated constituents in the recited proportions can be made by employing different concentrations of sodium alginate solutions and water-soluble caseinate solutions than those given above or by adding dry sodium alginate to a solution of water-soluble caseinate, and/or soya bean proteinate to produce concentrates having the constituents in the proportions set forth above.

The following exemplify use of the concentrate in producing oil-in-water emulsion vehicles for coloring textiles. Twenty parts of a concentrate containing 3.0% sodium alginate, 0.75% ammonium caseinate and 96.5% water, are mixed with 14.61 parts of sodium formaldehyde sulphoxylate, 9 parts sodium carbonate, 5 parts glycerine, 28.8 parts hydrocarbon oil (8181 mineral spirits) and 22.59 parts water. The mixing is carried out by dissolving the sodium formaldehyde sulphoxylate, and sodium carbonate, in the concentrate to which the 22.59 parts of water are added. Thereafter the resulting solution is mixed with the hydrocarbon oil while agitating the mixture. After the addition of all of the hydrocarbon oil and the glycerin, the agitation is continued and the resultant oil-in-water emulsion is fed through a colloid mill equipped with a cooling jacket to maintain the emulsion temperature below 80° F. The resultant oil-in-water emulsion vehicle had the following composition:

| | |
|---|---|
| Water | 38.84 |
| Sodium alginate | 3.00 |
| Ammonium caseinate | .75 |
| Sodium carbonate | 9.00 |
| Sodium formaldehyde sulphoxylate | 14.61 |
| Hydrocarbon oil | 28.80 |
| Glycerin | 5.00 |
| | 100.00 |

The emulsion was exceptionally stable; on storage for long periods, several months, it showed no signs of breaking.

This emulsion was mixed with the vat dyestuffs, 2,2-dimethoxydibenzanthrone and thiazole derivatives of 2,6-dibenzamidanthraquinone in the proportion of 10% vat dyestuff to 90% emulsion to produce printing pastes. These pastes were printed on cotton textiles, followed by aging and washing in the conventional manner. Bright prints of improved color value free of "halo" results.

It will be appreciated that instead of the ammonium caseinate, ammonium, sodium, potassium or borax soya bean proteinate, or sodium, potassium or borax caseinate may be used in the same manner and with substantially the same results.

It will be noted that the present invention provides concentrates which facilitate the production of oil-in-water emulsion vehicles suitable for use in the coloring of textiles, which concentrates result in the production of emulsions of improved suitability, including emulsions containing electrolytes. The concentrates act as emulsifying agents, stabilizers for the emulsions, antioxidants for the reducing agent, and temporary binders for the dye, which binders are water-soluble, and hence readily removable by water washes. The concentrates have the property of minimizing migration of the dye when applied to the fabric, with consequent reduction of "halo."

What is claimed is:

1. A concentrate for the production of oil-in-water emulsions for coloring textiles, said concentrate containing from about 0.75% to 3.75% by weight of a water-soluble compound from the group consisting of water-soluble caseinates, soya bean proteinates and mixtures thereof, from 2.4% to 3% by weight of sodium alginate, and from 93.25% to 96.85% by weight of water.

2. A composition of matter containing from 0.75% to 3.75% by weight of ammonium caseinate, from 2.4% to 3% by weight of sodium alginate, and from 93.25% to 96.85% by weight of water.

3. A composition of matter containing from 0.75% to 3.75% by weight of water-soluble caseinate, from 2.4% to 3% by weight of sodium alginate, and from 93.25% to 96.85% by weight of water.

4. A composition of matter containing from 0.75% to 3.75% by weight of water-soluble soya bean proteinate, from 2.4% to 3% by weight of sodium alginate, and from 93.25% to 96.85% by weight of water.

5. A composition of matter containing about 0.75% by weight of a water-soluble compound from the group consisting of water-soluble caseinates, soya bean proteinates and mixtures thereof, about 3% by weight of sodium alginate, and about 96.25% by weight of water.

References Cited in the file of this patent

UNITED STATES PATENTS

| | | |
|---|---|---|
| 2,361,277 | Enderlin | Oct. 24, 1944 |
| 2,587,905 | Saville | Mar. 4, 1952 |

OTHER REFERENCES

Knecht: The Principles and Practice of Textile Printing, Knecht and Fothergill, 4th ed., Griffin and Co., London, 1952, page 130.

Sutermeister and Browne: Casein and Its Ind. Applications, 2nd ed., Reinhold Pub. Co., N.Y., 1939, p. 338.